Figure 1:
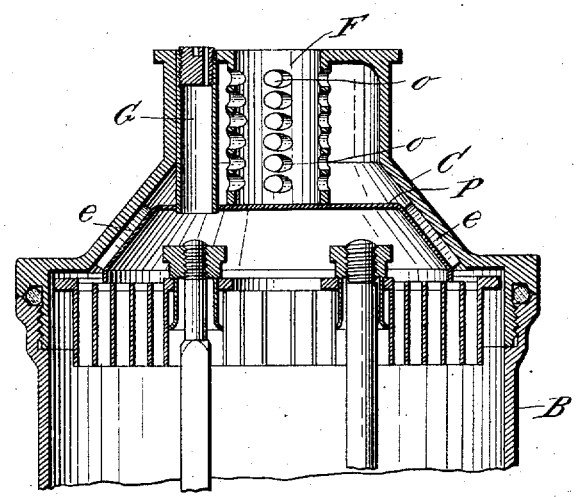

P. L. KIMBALL.
CENTRIFUGAL CREAM SEPARATOR.
APPLICATION FILED MAR. 12, 1909.

941,881.

Patented Nov. 30, 1909.

WITNESSES:
Frank G. Parker
John Buckler

INVENTOR:
Perley L. Kimball,
By Reuben L. Roberts,
Attorney.

UNITED STATES PATENT OFFICE.

PERLEY L. KIMBALL, OF BELLOWS FALLS, VERMONT, ASSIGNOR TO VERMONT FARM MACHINE COMPANY, OF BELLOWS FALLS, VERMONT, A CORPORATION OF VERMONT.

CENTRIFUGAL CREAM-SEPARATOR.

941,881.  Specification of Letters Patent.  Patented Nov. 30, 1909.

Application filed March 12, 1909. Serial No. 482,984.

*To all whom it may concern:*

Be it known that I, PERLEY L. KIMBALL, a citizen of the United States of America, residing at Bellows Falls, in the county of Windham and State of Vermont, have invented certain Improvements in Centrifugal Cream-Separators, of which the following is a specification.

This invention relates to centrifugal cream-separators, particularly to that portion through which the whole milk is fed to the apparatus, and consists in an axially located chamber, to which the milk is first introduced, in the upper part of the apparatus, which chamber is provided with a series of outlets extending through its walls obliquely from the interior to the exterior surface in a direction opposite to that in which the separator bowl is intended to be revolved when in operation.

Heretofore the feed chamber in the upper end of the rod which clamps together the cover and bowl of the separator, has been provided with outlets for the milk with blades projecting therefrom into the space within the chamber. When the separator is rotating at proper speed, that is, from 6000 to 7000 turns per minute, these blades strike the milk within the chamber with great force and tend to churn it and break up the fat globules, and as is said in Patent No. 724,195, dated March 31, 1903, "assist in spraying the milk into the upper compartment of the separator". It also tends to throw the milk with force against the inner walls of such compartment and beat it into a froth; all of which is a great detriment to the proper separation of the fatty or cream portion from the solid and watery portions of the milk.

It is a well known fact that it is a great detriment in making both butter and ice cream, to have the cream globules broken, for it produces what may be termed free fat, and this will cause white spots in the butter made therefrom and will cause it to deteriorate more quickly, and when used for ice cream will greatly detract from its smoothness.

The improved construction of outlets from the feed chamber herein described and claimed, reduces these objectionable features and results of operation to a minimum at least, and it is believed wholly eliminates them; for, the feed chamber has no inwardly projecting portions to thrash the milk therein, and no obstructing projections upon the outside of the chamber which tend to throw it radially therefrom, or abruptly force a change in its movement, and the milk flows through the obliquely formed outlets at a much less speed than that of the rotation of the apparatus; it is not churned nor sprayed in the operation, and is not thrown violently against the walls of the upper compartment of the separator, thus avoiding all liability to break the cream globules.

Figure 2:
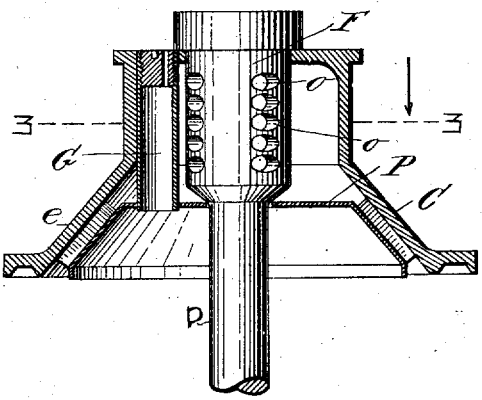
Figure 3:
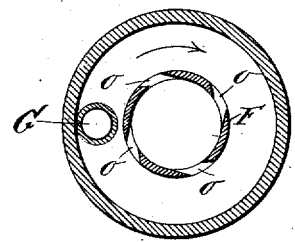

In the drawings which form a part of the specification, Figure 1 is a diametrical vertical section of the cover containing a feed chamber with the improved form of outlets, and of the upper part of the bowl of a cream separator; Fig. 2 is a diametrical vertical section of a separator cover with the feed chamber in the upper end of the cover clamping rod, and provided with the improved outlets in the wall of such chamber; Fig. 3 is a sectional plan view of the cover and feed chamber on line 3—3, Fig. 2.

Referring to the drawings and designating the several parts of the apparatus by letters,—in Fig. 1 the cover C is attached to the bowl B by a screw connection. In the upper part of the cover is a feed chamber F closed at the bottom and provided with a series of liquid outlets *o* which may conveniently be arranged in vertical rows, preferably two or more. These outlets extend through the walls of the feed chamber obliquely from the interior to the exterior surface thereof in a direction opposite to that in which the bowl is intended to be revolved when in operation, indicated by an arrow, Fig. 3, where the oblique direction of these milk outlets is also shown. P is an inverted frusto-conical partition in the lower part of the cover and separated from the inner surface thereof by spacing pieces *e*, thus leaving a passage between them for the milk from the space in the upper part of the cover down to cream separating subdividers S in the bowl. G is the cream discharge tube, and in the construction shown, the skimmed milk outlets are at the bottom of the bowl.

In Fig. 2, the feed chamber F is formed in the enlarged upper end of the cover clamping rod D, and the milk outlets o extend obliquely through the wall of this chamber the same as that illustrated in Fig. 1.

I claim:—

1. In a centrifugal cream separator, provided with an axially located cylindrical chamber in the upper part of the apparatus for the reception of the whole milk, milk outlets from the chamber extending through the walls thereof obliquely from its interior to its exterior surface in a direction opposite to that in which the separator is intended to revolve when in operation, and free unobstructed flow passages for the liquid within and without the walls of the chamber beyond the said milk outlets.

2. In a centrifugal cream separator, provided with an axially located cylindrical chamber in the upper part of the apparatus within the limits of the cover, for the reception of the whole milk, a plurality of milk outlets from said chamber extending through its walls obliquely from the interior to the exterior surface thereof in a direction opposite to that in which the separator is intended to revolve when in operation, and a chamber in the upper part of the cover which surrounds the cylindrical chamber and receives the milk which flows therefrom.

3. In a centrifugal cream separator, provided with a clamping rod extending down through and engaging the cover of the apparatus and being attached to the bottom of the bowl, a feed chamber at the upper part of the apparatus in the end of the clamping rod, a plurality of milk outlets from such chamber extending through its walls obliquely from the interior to the exterior surface thereof in a direction opposite to that in which the bowl is revolved when in operation, and a chamber in the upper part of the cover which surrounds said feed chamber and receives the milk which flows therefrom.

PERLEY L. KIMBALL.

Witnesses:
R. C. BIDWELL,
F. C. HILDRETH.